United States Patent
Whitesmith

[11] Patent Number: 5,588,082
[45] Date of Patent: Dec. 24, 1996

[54] OPTICAL CABLE FUSION SPLICE

[76] Inventor: Peter J. Whitesmith, "Aisling", Wyche Lane, Bunbury, Tarporley, Cheshire CW6 9PS, England

[21] Appl. No.: 529,999

[22] Filed: Sep. 19, 1995

[30] Foreign Application Priority Data

Sep. 20, 1994 [GB] United Kingdom ............... 9418878

[51] Int. Cl.$^6$ .............................. G02B 6/00; G02B 6/36
[52] U.S. Cl. ............................................ 385/96; 385/135
[58] Field of Search .................................. 385/134, 135, 385/141, 95, 96

[56] References Cited

U.S. PATENT DOCUMENTS

| 5,278,933 | 1/1994 | Hunsinger et al. | 385/135 |
| 5,323,480 | 6/1994 | Mullaney et al. | 385/135 |
| 5,333,233 | 7/1994 | Mansfield | 385/134 |
| 5,515,472 | 5/1996 | Mullaney et al. | 385/135 |

FOREIGN PATENT DOCUMENTS 0507585  10/1992  European Pat. Off. .

Primary Examiner—Akm E. Ullah
Attorney, Agent, or Firm—Cumpston & Shaw

[57] ABSTRACT

A method of forming a fusion splice between two optical ribbon cables, which comprises: (i) positioning end portions of the ribbon cables to be spliced in line with one another, and separated from one another by a pre-determined distance; (ii) firing a preparation arc across the ends of the ribbon cables of sufficient energy to soften the ends of the optical fibres forming the ribbon cables and to cause the end of any fibre or fibres (if any) that is/are the most prominent to retract; (iii) firing a fusion arc across the ends of the ribbon cables after a defined period of time following termination of the preparation arc to fuse the ends of the fibres; and (iv) simultaneously with, or subsequent to the fusion arc, moving the ribbon cables toward one another into contact, thereby to effect a fusion splice between the ribbon cables.

13 Claims, 1 Drawing Sheet

OPTICAL CABLE FUSION SPLICE

This invention relates to the formation of fusion splices in optical fibres, and in particular to the formation of fusion splices in optical ribbon cables, comprising a plurality of optical fibres arranged side-by-side in a common plane.

The conventional method of forming a fusion splice between a pair of optical fibres comprises cleaving the fibres to form a pair of fibre end portions with prepared end faces, positioning the fibres in line with each other with their ends a defined distance apart, firing a fusion arc across the ends of the fibre with sufficient energy to cause the ends of the fibres to soften and become tacky, and to move the fibres towards each other into contact (hereinafter referred to as "stuffing" the fibres). The stuffing operation will cause the ends of the fibres to be held together by surface tension while the fibre ends cool. Typically a cleaving operation will produce a fibre with a prepared end face that is perpendicular to the fibre axis to an accuracy in the order of 1°, which is sufficient to ensure an acceptable splice. If desired, it is also possible to include the firing of a cleaning arc across the ends of the optical fibres in order to blow off any particles of dust or other material that could cause imperfections in the splice. Such cleaning arcs are designed to be insufficient (usually only just insufficient) to cause softening of the ends of the fibres.

Recently, optical ribbon cables have been developed which comprise a plurality of optical fibres laid side-by-side in a common plane. Such optical ribbon cables may typically comprise four fibres, although more recently ribbon cables having a higher number of fibres, e.g. twelve fibres, have been developed. However, the greatly increased lateral dimensions of a ribbon cable as compared with a single optical fibre exacerbates problems caused due to tolerances of the cut angle. While a 0.5° deviation from perpendicularity in the cleavage of a single optical fibre will cause different sides of the fibre to differ in length of about 1 μm, the same deviation in the case of a twelve fibre optical ribbon cable of typical width of 3 mm will cause the length of the fibres to vary across the ribbon cable by about 20 μm to 30 μm. In the worst case, this could cause the separation of individual fibres in the two ribbon cables to vary by up to 60 μm when the cable ends are presented to each other, with the result that the most prominent fibres of the ribbon cables may be over stuffed during the stuffing operation leading to unacceptably high signal attenuation in the splice (splice loss) and/or the least prominent fibres of the ribbon cable are insufficiently stuffed leading again to unacceptably high splice loss.

The present invention provides a method of forming a fusion splice between two optical ribbon cables, which comprises:

(i) positioning end portions of the ribbon cables to be spliced in line with one another, and separated from one another by a pre-determined distance;

(ii) firing a preparation arc across the ends of the ribbon cables of sufficient energy to soften the ends of the optical fibres forming the ribbon cables and to cause the end of any fibre or fibres (if any) that is/are the most prominent to retract;

(iii) firing a fusion arc across the ends of the ribbon cables after a defined period of time following termination of the preparation arc to fuse the ends of the fibres; and (iv) simultaneously with, or subsequent to the fusion arc, moving the ribbon cables toward one another into contact, thereby to effect a fusion splice between the ribbon cables.

The method according to the invention has the advantage that since the most prominent fibres of the ribbon cables are caused to soften more than the least prominent fibres by the preparation arc and thereby caused to retract more under the surface tension of the material (usually silica) forming the fibres, the overall deviation from perpendicularity of the end of the ribbon cables is reduced before the fusion and stuffing operations. Although this will not necessarily reduce the median of the splice loss of fibres in the ribbon cables, it will reduce substantially the number of fibres in the ribbon cables that exhibit a significantly higher splice loss and so reduce the standard deviation of splice loss values recorded. It is estimated that the standard deviation in splice loss of individual fibres will be reduced by about 10 to 20% which will substantially reduce the number of splices in ribbon cables in which one or more fibres exhibit an unacceptable splice loss.

The method may include the step of firing a cleaning arc across the ends of the ribbon cable before the preparation arc is fired so that in such a method a total of three or more separate arcs of increasing energy will be fired. The preparation arc will normally have an energy of at least three times that of the cleaning arc and usually from five to fifteen times that of the cleaning arc. Thus, typically, the cleaning arc may have an energy in the range of from 0.2 to 2 joules, whereas the preparation arc may have an energy in the range from 1 to 20 joules. It is not, in fact, necessary to modify equipment significantly in order to provide a separate preparation arc of higher energy than that of the cleaning arc. For example, the preparation arc may comprise a plurality of discrete arcs each of which may be of insufficient energy to soften the ends of the fibres, for instance, of the same energy as the cleaning arcs. Thus it is possible to employ existing equipment that is designed to provide a cleaning arc and a fusion arc, by modifying the control program of the equipment such that a number of cleaning arcs are fired in rapid succession. If the cleaning arcs are fired sufficiently rapidly (e.g. at least two arcs per second) that the ends of the fibres do not have time to cool between the arcs, the temperature of the ribbon cables will rise until the fire ends have softened. Firing about six to ten such cleaning arcs should result in softening of the fibres with the most prominent fibres softening more than the least prominent fibres.

After termination of the preparation arc, the ribbon fibres should be allowed to cool and solidify before firing of the fusion arc. For example, the ribbon cables should be left for a period of at least 0.5 seconds and especially at least 1 second before the fusion arc fired, by which time the temperature of the fibre ends will have fallen to the region of 300° C. It is desirable to allow the ends of the ribbon cables to cool after the preparation arc has been fired in order to achieve a relatively even degree of heating across the ribbon cable by the fusion arc. If the ribbon cables had not been allowed to cool, there would be the danger that the most prominent of fibres of the ribbon cables would become to hot in the fusion arc and melt fully, resulting in a unacceptable splice loss.

The method according to the invention, is not limited to the use of a single preparation arc. It is quite possible to employ more than one such arc, and indeed according to one possible preferred aspect the invention includes the step of inspecting the ends of the ribbon cables after termination of the preparation arc, and firing a further preparation arc if necessary dependent on the visual inspection of the ribbon cable ends. Such a step may be repeated until the prepared ends of the ribbon cables are satisfactory for the fusion/stuffing steps.

A method, according to the invention, will now be described by way of example with reference to the accompanying drawings in which.

Figure 1:
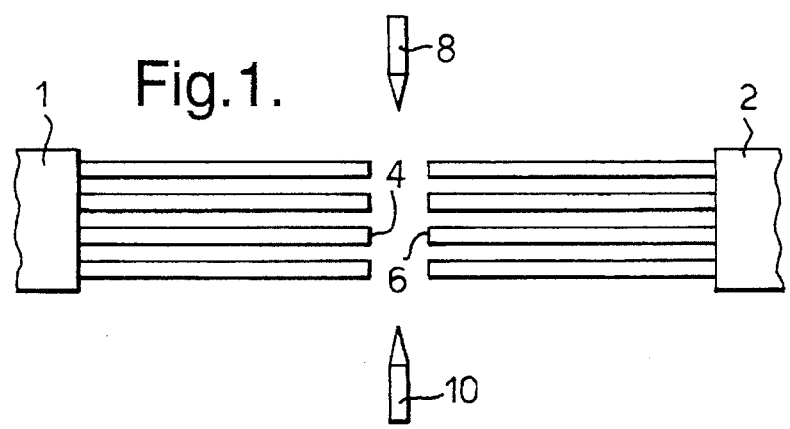
FIG. 1 is a schematic representation of a pair of optical ribbon cables positioned in a fusion splicing device.

Referring to the accompanying drawings, FIG. 1 shows schematically a pair of optical ribbon cables 1 and 2 that are about to be fusion spliced. The ribbon cables have ben cut and stripped by about 10 mm by conventional means in order to form the end portions in which the end faces 4 and 6 of the cables are generally perpendicular to the ribbon cables to within 1°. The length of the stripped portion of the ribbon cables is not drawn to scale in FIGS. 1 and 2 but has been reduced for the sake of clarity. The end portions of the ribbon cables 1 and 2 are then positioned in a fusion splicer, in which the ribbon cables are held in line with each other and a defined distance apart (typically in the range of from 40 to 60 μm). Splicing devices that may be employed are commercially available from Biccotest Limited of Cheshunt, U.K. under the trade marks "Spliceman", AFS3100 and AFS4100 and can be of the general type described in European Patent Application No.0507585.

Figure 2:
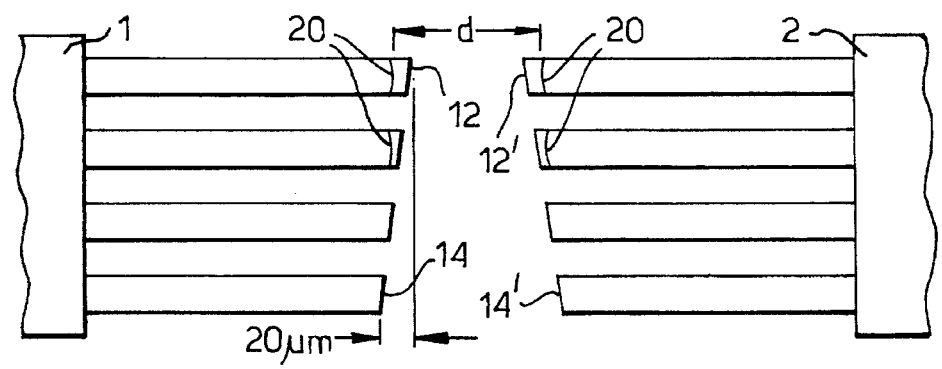
FIG. 2 is an enlarged view of the ends of the optical fibre ribbons with deviations in the cleaving angle exaggerated for the sake of clarity.

As shown in FIG. 2, if the cables 1 and 2 are not cut exactly perpendicularly to their ends (in this case about 0.5° from being perpendicular), opposite sides of the cable will differ in length by about 20 μm. This will have the result that in the worst case, as shown, the separation between different fibres to be spliced will differ by 40 μm, with the result that the most prominent fibres, 12 and 12' risk being over stuffed during the stuffing operation, while the least prominent fibres 14, 14' risk being understuffed, each of which having the result that an unacceptably high splice loss is achieved.

Figure 3A:
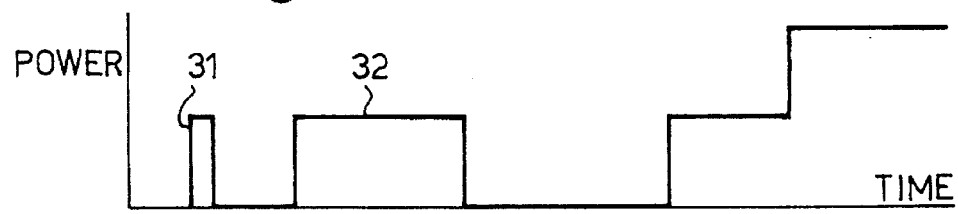
FIGS. 3a & b are graphs showing two possible arc sequences employed according to the invention.

A cleaning arc is struck across the ribbon cables 1 and 2 in the gap between them by means of arc electrodes 8 and 10. The electrode voltage is about 400 v once the arc has been struck, and current is about 18 mA. The cleaning arc will last for approximately 100 ms so that the total arc energy is 0.7 J which is slightly less than that required to soften the fibres forming the ribbon cable. The cleaning arc is shown as peak 31 of FIG. 3.

After the cleaning arc has terminated, a preparation arc 32 is struck. This arc has the same voltage and current as the cleaning arc but lasts for a period of 600 ms, with the result that the fibre ends soften and the ends of at least the most prominent fibres retract under the surface tension of the softened silica to give a profile 20 as shown in FIG. 2. Because it is the most prominent fibres that soften to the greatest degree, the degree by which fibres on opposite sides of the ribbon cable differ in length will be reduced slightly, thereby effectively making the prepared end faces of the ribbon cables more perpendicular to the cables.

After a period of approximately 0.5 to 1 s from the termination of the preparation arc, the fusion arc is struck during which the arc current is maintained at 11 mA for 200 ms and is then increased to 15 mA for a period typically of up to 10 s. Simultaneously, the ribbon ends are moved into contact and the fusion splice is effected.

Figure 3B:
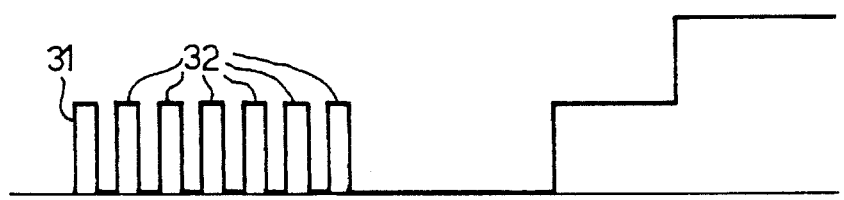

An alternative arc regime is shown in FIG. 3b. In this case, instead of a single preparation arc of 600 ms duration, six further cleaning arcs 32' are struck at intervals of about 0.25 s so that the fibre ends do not have time to solidify between arcs.

What I claim as my invention is:

1. A method of forming a fusion splice between two optical ribbon cables, which comprises:
    (i) positioning end portions of the ribbon cables to be spliced in line with one another, and separated from one another by a pre-determined distance;
    (ii) firing a preparation arc across the ends of the ribbon cables of sufficient energy to soften the ends of the optical fibres forming the ribbon cables;
    (iii) firing a fusion arc across the ends of the ribbon cables after a defined period of time following termination of the preparation arc to fuse the ends of the fibres; and
    (iv) simultaneously with, or subsequent to the fusion arc, moving the ribbon cables toward one another into contact, thereby to effect a fusion splice between the ribbon cables.

2. A method, as claimed in claim 1, which includes the step of firing a cleaning arc across the ends of the ribbon cable before the preparation arc is fired.

3. A method, as claimed in claim 2, wherein the preparation arc has an energy at least three times that of the cleaning arc.

4. A method, as claimed in claim 3, wherein the preparation arc has an energy from five to fifteen times.

5. A method, as claimed in claim 2, wherein the cleaning arc has an energy in the range of from to 2 joules.

6. A method, as claimed in claim 1, wherein the preparation arc has an energy in the range of from 1 to 20 joules.

7. A method, as claimed in claim 1, wherein the said defined period of time before firing of the fusion arc is sufficient to allow the ends of the optical fibres to solidify.

8. A method, as claimed in claim 1, wherein the said defined period of time before firing of the fusion arc is at least 0.5 seconds.

9. A method, as claimed in claim 1, wherein the preparation arc comprises a plurality of discrete arcs that are each of insufficient energy to soften the ends of the fibres.

10. A method, as claimed in claim 1, wherein each optical ribbon cable comprises at least four optical fibres.

11. A method, as claimed in claim 10, wherein each optical ribbon cable comprises at least twelve optical fibres.

12. An optical ribbon cable that includes a fusion splice formed by a method, as claimed in claim 1.

13. A method of forming a fusion splice between two optical ribbon cables, which comprises:
    (i) positioning end portions of the ribbon cables to be spliced in line with one another, and separated from one another by a pre-determined distance;
    (ii) firing a preparation arc across the ends of the ribbon cables of sufficient energy to soften the ends of the optical fibres forming the ribbon cables and to cause the end of any fibre or fibres (if any) that is/are the most prominent to retract;
    (iii) firing a fusion arc across the ends of the ribbon cables after a defined period of time following termination of the preparation arc to fuse the ends of the fibres; and
    (iv) simultaneously with, or subsequent to the fusion arc, moving the ribbon cables toward one another into contact, thereby to effect a fusion splice between the ribbon cables.

* * * * *